United States Patent [19]

Jarman et al.

[11] 4,167,816
[45] Sep. 18, 1979

[54] RADIUS TURNTABLE GAUGE FOR FRONT END ALIGNMENT OF MOTOR VEHICLES

[76] Inventors: Davis R. Jarman, 612 Ward Dr.; Virgil H. Hinson, 206 Fairway Oaks Dr., both of Brunswick, Ga. 31520

[21] Appl. No.: 915,807
[22] Filed: Jun. 15, 1978
[51] Int. Cl.$^2$ ............................................. G01B 5/255
[52] U.S. Cl. .................................................. 33/203.12
[58] Field of Search ................ 33/203, 203.12, 203.15, 33/203.17, 203.2

[56] References Cited

U.S. PATENT DOCUMENTS

| | | | |
|---|---|---|---|
| 1,877,045 | 9/1932 | Phelps | 33/203.17 |
| 2,543,197 | 2/1951 | Phillips | 33/203.17 |
| 3,231,983 | 2/1966 | Bender | 33/203.12 X |

*Primary Examiner*—Harry N. Haroian
*Attorney, Agent, or Firm*—Clarence A. O'Brien; Harvey B. Jacobson

[57] ABSTRACT

A radius turntable gauge for facilitating front end alignment of motor vehicles has a supporting frame on which a turntable assembly is suspended so as to position a rotatable turntable for receiving a wheel of a vehicle being aligned. The turntable assembly includes a platform suspended directly from the supporting frame of the device, with the turnplate being rotatably journaled on the platform. A pointer mounted on the platform is arranged extending beyond and partially above the turnplate, with indicia being provided on an upwardly facing surface of the turnplate adjacent the pointer for indicating angular measurements in cooperation with the pointer. The turntables are generally employed in pairs with each turntable receiving a respective one of the front wheels of a motor vehicle to be aligned, and suitable brackets are provided on the supporting frame of each turntable for removably receiving a respective end of a longitudinally extending toe-in gauge rod so as to permit the difference between pointers provided on the rod to be measured for the front and rear of the associated wheels and permit the toe-in of the wheels to be readily determined.

10 Claims, 6 Drawing Figures

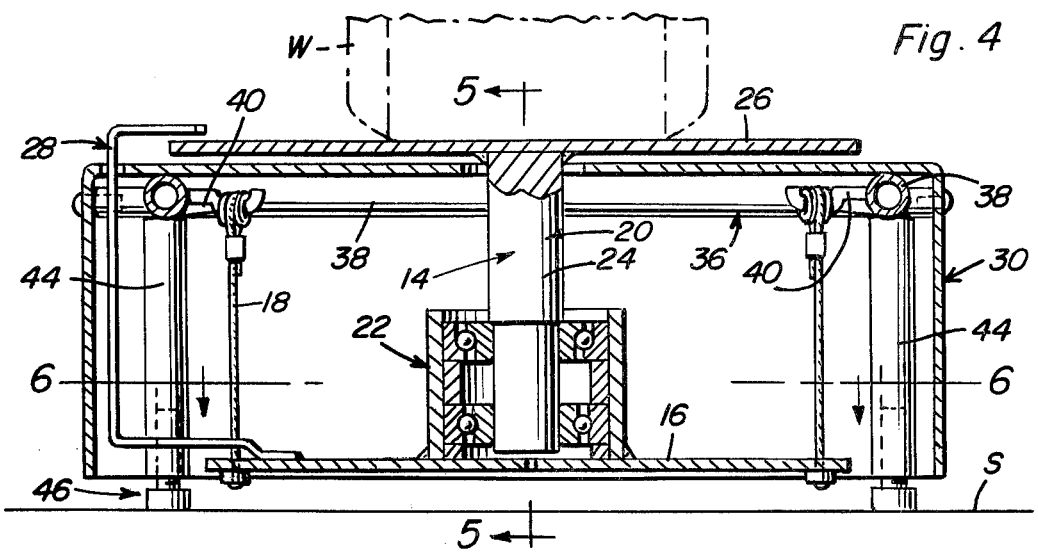
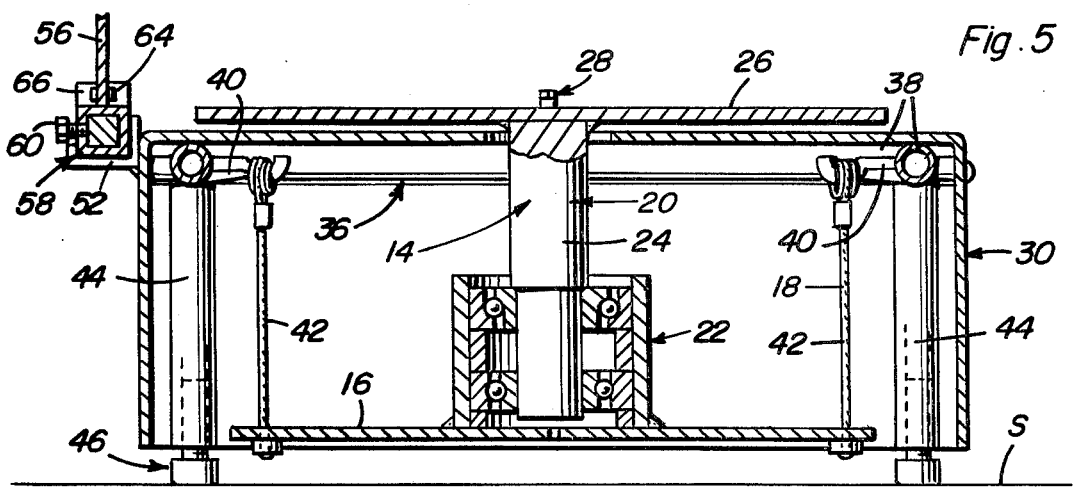
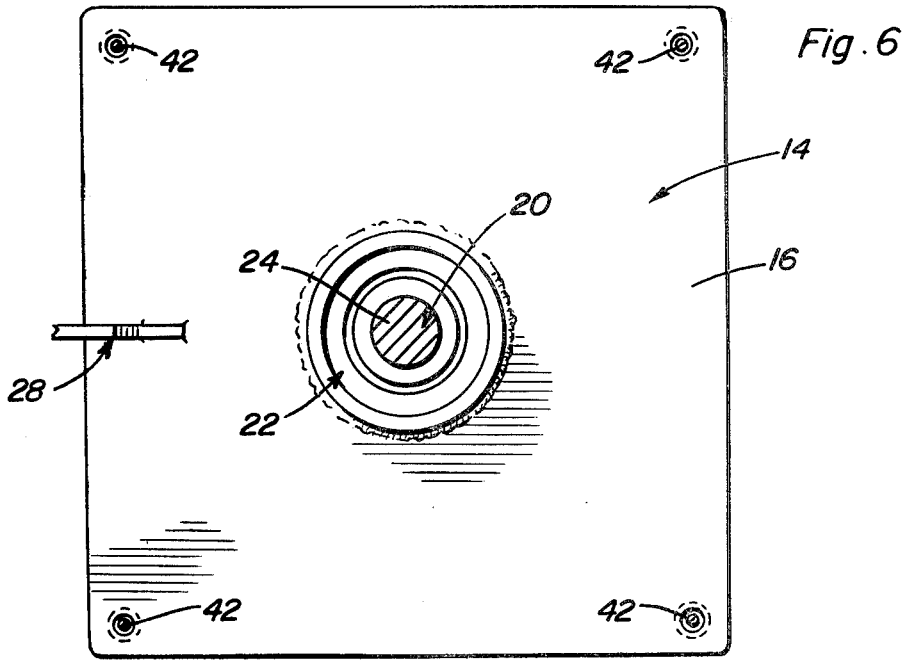

RADIUS TURNTABLE GAUGE FOR FRONT END ALIGNMENT OF MOTOR VEHICLES

BACKGROUND OF THE INVENTION

1. Field of the Invention

This invention relates generally to the alignment of the front, or steering, wheels of a motor vehicle, and particularly to a radius turntable gauge for facilitating such front end alignment of motor vehicles.

2. Description of the Prior Art

Various devices have been proposed for the straightening of frames, the correction of misalignment and for accomplishing the checking of such straightening work as it is in progress, but generally these known devices are large, heavy, and require substantial space, with the result that they are not convenient for use for quickly checking the alignment to determine the accuracy of the work being conducted.

U.S. Pat. No. 2,250,742, issued July 29, 1941, to C. C. Bennett, discloses a chassis analyzer employing a radius turntable gauge and which is of generally light weight and compact construction. Additional examples of radius gauges intended for use in the alignment of front ends of automobiles can be found in U.S. Pat. Nos: 2,125,534, issued Aug. 2, 1939, to H. Wochner; 2,155,541, issued Apr. 25, 1939, to G. M. Graham, et al.; 2,736,104, issued Feb. 28, 1956, to W. T. Sherman; and 3,181,248, issued May 4, 1965, to M. C. Manlove. None of these known turntables, however, are suitable for use with frame and body straightening equipment of the type employing a fixed, continuous track within which the vehicle is disposed so as to be acted upon by pulling equipment anchored on the track. This type of equipment, which is becoming increasingly popular in the body and frame straighteneing industry, creates special problems as regards the alignment of the front end of a vehicle being repaired.

Many radius turntable gauges are employed which are sunken into a floor or other supporting surface in which alignments are to be conducted. A serious problem encountered with such gauges is that they tend to collect dirt and debris, and eventually become so gummed-up as to become bothersome and unreliable in operation. Thus, maintenance with these known units is very high. While those turntables disclosed in the prior patents cited above are generally disposed above the surface supporting the turntable gauge, these units are generally constructed in a rigid manner which creates levelling and other operational problems.

U.S. Pat. No. 3,135,052, issued June 2, 1964, to C. W. MacMillan, discloses wheel alignment apparatus employing a pair of turntables, wheel-hub mounted camber caster gauges, and a toe-in gauge rod assembly, all of which elements cooperate with one another to check the alignment of the front end of a motor vehicle. The turntable and associated toe-in gauge assembly according to the present invention are intended to be employed with camber and caster gauges in a manner similar to the arrangement of elements as seen in U.S. Pat. No. 3,135,052.

SUMMARY OF THE INVENTION

It is an object of the present invention to provide a radius turntable gauge constructed in a manner to assure appropriate alignment without the necessity of levelling the supporting frame of the gauge relative to an associated floor or other supporting surface.

It is another object of the present invention to provide a radius turntable gauge constructed in a manner so as to reduce collection of dirt and debris within the gauge housing, and for facilitating the cleaning of the gauge and preventing the gumming-up of same.

Yet another object of the present invention is to provide a radius turntable gauge particularly suited for use in conjunction with body or frame straightening systems employing a fixed, continuous track within which the vehicle being repaired is disposed during such repair as may be necessary to the vehicle.

These and other objects are achieved according to the present invention by providing a radius turntable gauge having: a supporting frame; and a turntable assembly mounted on the supporting frame for receiving a wheel of a vehicle being aligned. Preferably, the turntable assembly includes: a platform; a support arrangement connected to the frame and to the platform for suspending the platform from the frame; and a turnplate assembly rotatably mounted on the platform for supporting the wheel of a vehicle being aligned.

The platform advantageously is arranged entirely within the supporting frame, with the turnplate assembly comprising a vertically oriented thrust bearing including a rotatable shaft, and a turnplate mounted on the shaft of the thrust bearing for rotation therewith. A pointer is mounted on the platform and arranged extending therefrom to beyond and partially above an upper surface of the turnplate with indicia being provided on such upward, or upwardly facing, surface of the turnplate adjacent the pointer for indicating angular measurements in cooperation with the pointer as a function of an angular position of the turnplate.

The support arrangement preferably includes a plurality of flexible elements extending between spaced points of the frame and corresponding spaced points of the platform. Advantageously, the frame is in the shape of a parallelepiped substantially rectangular, or square, in plan, and defining four corners, and the flexible elements extend from hangers provided in the corners of the frame.

Brackets are provided on the supporting frame of the radius turntable gauge in order removably support the longitudinal extended element of a toe-in gauge according to the invention, with the element having provided thereon a fixed first pointer, and a second pointer slidably, clampably disposed on the element for movement relative to the first pointer. A scale member is slidably mounted on the element adjacent the second pointer and provided with indicia giving a direct reading of the distance from a reference line associated with the scale member and the position of the second pointer both in front of and behind the wheels being aligned.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 4 is an enlarged, sectional view taken generally along the line 4—4 of FIG. 3.

FIG. 5 is a sectional view taken generally along the line 5—5 of FIG. 4.

FIG. 6 is a sectional view taken generally along the line 6—6 of FIG. 4, and showing only the central, lower portion of the structure seen in FIG. 4.

DESCRIPTION OF THE PREFERRED EMBODIMENTS

Figure 1:
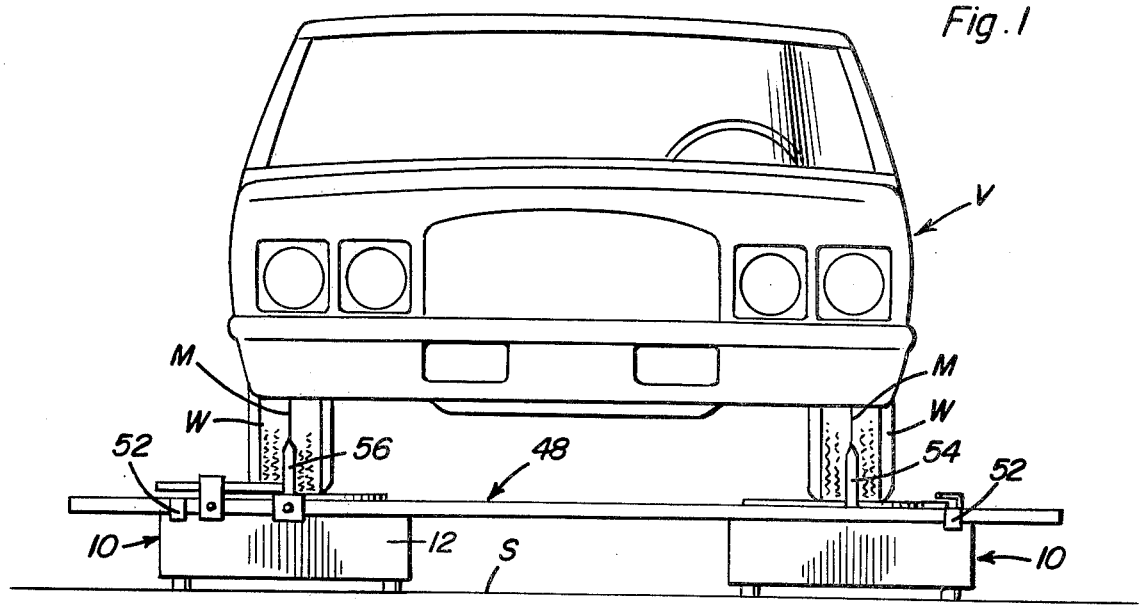
FIG. 1 is a schematic, front elevational view, showing a pair of radius turntable gauges and associated toe-in gauge according to the present invention being employed to facilitate the alignment of the front end of a motor vehicle.

Referring now more particularly to the figures of the drawings, a pair of radius turntable gauges 10 are shown in FIG. 1 as supporting the front wheels W of a motor vehicle V. As seen in FIGS. 2 through 6, each of the radius turntable gauges 10 comprises a supporting frame 12 and a turntable assembly 14 mounted on frame 12 for receiving a wheel W of vehicle V being aligned.

Turntable assembly 14 includes a generally planar platform 16 of substantially rectangular, or square, configuration in plan, and a support arrangement 18 connected to frame 12 and platform 16 for suspending platform 16 from frame 12. A turnplate assembly 20 is rotatably mounted on platform 16 for supporting an associated wheel W of a vehicle V being aligned.

Platform 16 is arranged entirely within frame 12 and includes a central thrust bearing 22 of conventional construction. The turnplate assembly 20 includes a rotatable shaft 24 journalled from bearing 22 and upon which a turnplate 26 is mounted for rotation with shaft 24. Shaft 24 extends above the upper of frame 12 so as to support turnplate 26 in elevated position relative to the frame 12 of gauge 10. A pointer 28 is mounted on platform 16 adjacent one side thereof and is arranged extending from the plane of platform 16 to beyond and partially above turnplate 26, so as to extend out of a housing 30 suitably enclosing frame 12, with indicia 32 being provided on an upwardly facing surface 34 of turnplate 26 adjacent the terminal end of pointer 28 above housing 30 for indicating angular measurements in cooperation with pointer 28. That is, indicia 32 and pointer 28 cooperate to indicate an angular position of turnplate 26 relative to a predetermined zero position of turnplate 26.

Frame 12 is in the shape of a parallelepiped being substantially rectangular, preferably square, in plan, and having an upper portion 36 defined by a continuous rail 38 having four corners, in each of which corners hangs a respective one of four hangers 40. The latter are cantilever mounted so as to extend diagonally from the associated corner of the continuous rail 38, with the support arrangement 18 including a plurality of flexible elements or cables 42 attached to respective hangers 40 and extending to corresponding spaced points on platform 16. More specifically, cables 42 extend to the corresponding corner of the platform 16 so as to extend substantially vertically from the bent attachment portion of hanger 40 to the point of attachment on platform 16.

Frame 12 includes in addition to the planar upper portion 36 a plurality of legs 44, specifically four in the illustrated embodiment, extending codirectionally and perpendicularly from the plane of upper portion 36, and substantially parallel to one another, for supporting upper portion 36 on a support surface such as that designated S in FIG. 1. Leg adjustment screws 46 are provided in the lower end portions of legs 44 for permitting levelling of upper portion 36 of frame 12 in a simple and convenient manner.

Figure 2:
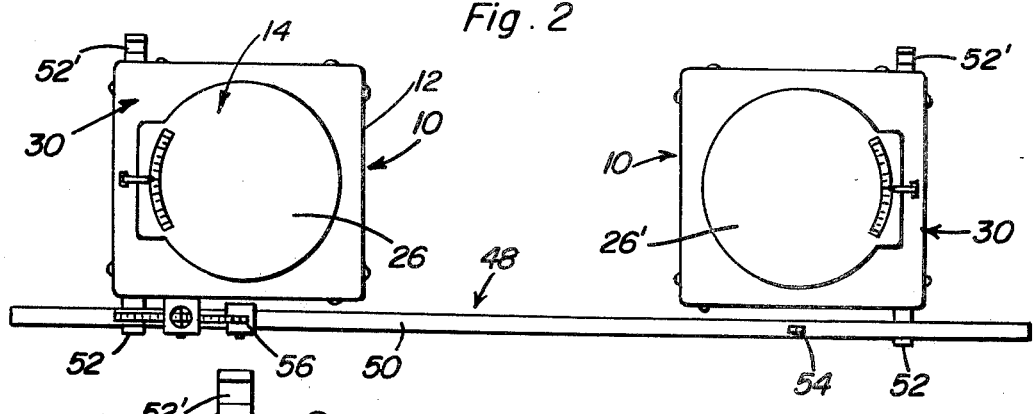
FIG. 2 is a top plan view showing the radius turntable gauges and tow-in gauge of FIG. 1, but with the motor vehicle removed.
Figure 3:
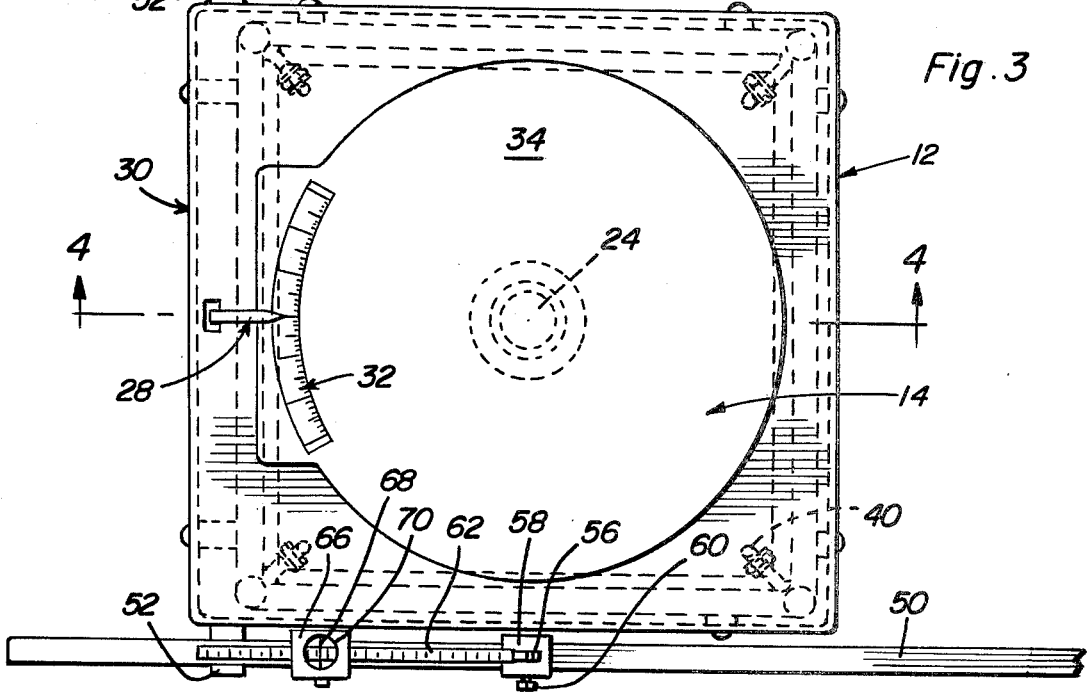
FIG. 3 is an enlarged, fragmentary, top plan view showing in detail the left hand portion of FIG. 2.

Used in conjunction with a pair of gauges 10, and particularly as seen in FIGS. 1 and 2, is a toe-in gauge including a longitudinally extending element or rod 50 selectively supportable in brackets 52 and 52' provided on the front and rear sides of the upper portion of housing 30. Rod 50 is provided with a fixed first pointer 54 and a second pointer 56 slidably clampably disposed on rod 50 for movement relative to pointer 54. Pointer 56, as can best be seen from FIG. 3, is advantageously movably mounted on rod 50 as by the illustrated sleeve 58 and associated clamp screw 60. A scale member 62 is slidably mounted on rod 50 as by insertion into the slot 64 provided in a collar 66 affixed on rod 50, such that indicia provided on member 62 will give a direct reading of the distance from pointer 56 to a reference line formed by mark 68 provided on collar 66, and particularly provided in the illustrated window 70 provided in the top portion of collar 66 so as to communicate with slot 64.

Once wheels W of vehicle V are suitably positioned on turnplates 26 of radius turntable gauge 10, camber and caster can be measured in the conventional manner by use of a suitable wheel alignment tool. In particular, it is contemplated that a magnetically attachable alignment gauge manufactured by "Wheel-O-Matic of America" will be employed in conjunction with gauges 10 and 48 according to the present invention. Toe-in is then determined by first scribing a mark M on each of the wheels W substantially centrally of the periphery of the wheel and aligning the pointer 54 with a scribe mark M provided on the wheel W associated with pointer 54. Next, pointer 56 is positioned so as to be aligned with the mark M provided on the wheel W associated with the pointer 56 and the pointer 56 fixed in position by suitable actuation of clamp screw 60. Scale member 62 can be moved into abutting relationship with pointer 56 and a reading taken. Now, gauge 48 is removed from brackets 52 and mounted on brackets 52' provided adjacent the rear of the wheels W, pointer 54 properly positioned and pointer 56 adjusted so as to again be aligned with its corresponding scribe mark M. Another reading is taken by use of scale member 62, and the difference between these two readings can be used to accurately determine the toe-in angle of the wheels W, since the distance between brackets 52 and 52' will always remain the same regardless of the radius of the tires mounted on the wheels being aligned.

As can be readily understood from the above description and from the drawings, a radius turntable gauge according to the present invention eliminates freedom of movement problems, gum-up and the like, commonly encountered by conventional turntable gauges. Further, the turntable gauges can be employed with conventional rear-wheel stands (not shown) and the like to help support a vehicle disposed within a continuous anchor track (not shown), and the like, as conventionally employed in a body and frame straightening system. Thus, wheel alignment can be readily insured during the repair of damaged automobiles and other vehicles.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A radius turntable gauge for facilitating front end alignment of motor vehicles, comprising, in combination:
   (a) a supporting frame; and
   (b) turntable means mounted on the supporting frame for supportingly receiving a wheel of a vehicle being aligned, said turntable means including, in combination:
      (1) a platform;
      (2) support means connected to the frame and to the platform for suspending the platform from the frame; and
      (3) a turnplate assembly rotatably mounted on the platform for supporting the wheel of the vehicle being aligned.

2. A structure as defined in claim 1, wherein the platform is arranged within the frame, and the turnplate assembly comprises a vertically oriented thrust bearing including a rotatable shaft, and a turnplate mounted on the shaft of the thrust bearing for rotation with the shaft.

3. A structure as defined in claim 1, wherein a pointer is mounted on the platform and arranged extending from the platform to and partially above the turnplate assembly, indicia being provided on an upwardly facing surface of the turnplate assembly adjacent the pointer for indicating angular measurements in cooperation with the pointer.

4. A structure as defined in claim 1, wherein the support means includes a plurality of flexible elements extending between spaced points of the frame and corresponding spaced points on the platform.

5. A structure as defined in claim 4, wherein the frame is in the shape of a parallelepiped being substantially rectangular in plan and defining four corners, and the support means further including four hangers, one each of said hangers to a respective one of the corners of the frame and arranged extending inwardly diagonally of the frame, there being four of the cables, one each of such cables being attached to a respective one of the hangers.

6. A structure as defined in claim 5, wherein the frame includes a planar upper portion and a plurality of legs extending codirectionally and perpendicularly from the upper portion for supporting the upper portion on a support surface, the hangers lying in the plane of the upper portion, and leg adjustment means being provided on the legs disposed at end portions thereof spaced from the upper portion of the frame for permitting levelling of the upper portion of the frame.

7. A structure as defined in claim 6, wherein the platform is arranged within the frame, and the turnplate assembly comprises a vertically oriented thrust bearing including a rotatable shaft, and a turnplate mounted on the shaft of the thrust bearing for rotation with the shaft.

8. A structure as defined in claim 7, wherein a pointer is mounted on the platform and arranged extending from the platform to beyond and partially above the turnplate, indicia being provided on an upwardly facing surface of the turnplate adjacent the pointer for indicating angular measurements in cooperation with the pointer.

9. A structure as defined in claim 8, further including a longitudinally extending element provided with a fixed first pointer, and a second pointer slidably, clampably disposed on the element for movement relative to the first pointer, and a scale member slidably mounted on the element adjacent the second pointer and provided with indicia giving a direct reading of the distance to the second pointer from a reference line provided on the element, brackets being provided on spaced, substantially parallel sides of the supporting frame for removably supporting the longitudinally extending element for alignment of one of the pointers with a scribe mark provided on a wheel supported on the turnplate of the turntable means of the gauge.

10. A radius turntable gauge for facilitating front end alignment of motor vehicles, comprising, in combination:
   (a) a supporting frame; and
   (b) turntable means mounted on the supporting frame for supportingly receiving a wheel of a vehicle being aligned, a longitudinally extending element provided with a fixed first pointer, and a second pointer slidably, clampably disposed on the element for movement relative to the first pointer, and a scale member slidably mounted on the element adjacent the second pointer and provided with indicia giving a direct reading on the distance to the second pointer from a reference line provided on the element, brackets being provided on spaced, substantially parallel sides of the supporting frame for removably supporting the longitudinally extending element for alignment of one of the pointers with a scribe mark provided on a wheel supported on the turnplate of the turntable means of the gauge.

* * * * *